J. PRESTON.
Corn-Plows.

No. 138,818.

Patented May 13, 1873.

Witnesses.
N. H. Sincket
F. W. Howard

Inventor:
John Preston,
By Geo. W. Rothwell
Atty.

AM. PHOTO-LITHOGRAPHIC CO. N.Y. (OSBORNE'S PROCESS)

UNITED STATES PATENT OFFICE.

JOHN PRESTON, OF PLYMOUTH, OHIO.

IMPROVEMENT IN CORN-PLOWS.

Specification forming part of Letters Patent No. 138,818, dated May 13, 1873; application filed August 23, 1872.

*To all whom it may concern:*

Be it known that I, JOHN PRESTON, of Plymouth, in the county of Richland and State of Ohio, have invented certain Improvements in Shovel-Plows, of which the following is a specification:

My invention relates to the construction of shovel-plows of that class in which the beams and handles are made of iron, and is designed to obviate the liability to clog in stubble and weeds, and to otherwise improve this class of plows. The invention consists in an iron beam of peculiar form, combined with a sole or casting attached to the lower end of the beam, and with a guide-plate for steadying the plow, and a shovel, both secured to the sole, all arranged and operating substantially as hereinafter more particularly set forth.

Figure 1:
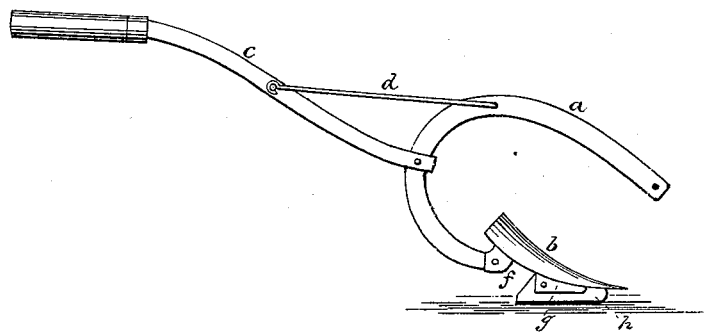
Figure 2:
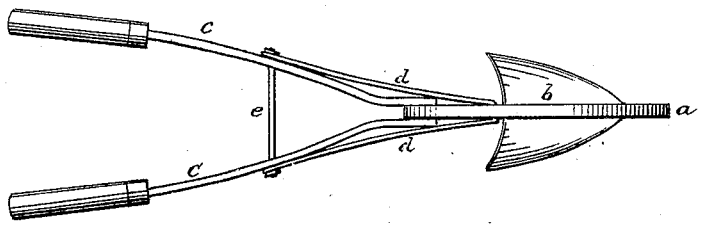
Figure 3:
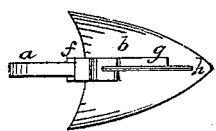
Figure 4:
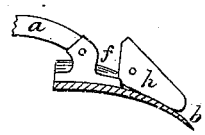

In the drawing, Figure 1 is a side elevation of a plow embodying my improvements. Fig. 2 is a top view of the same. Fig. 3 is an inverted-plan view of the shovel; and Fig. 4 is a longitudinal section thereof.

In the drawing, similar letters of reference indicate like parts in the several figures.

The beam $a$ is preferably made of flat bar-iron bent into about the form shown in Fig. 1, and the shovel $b$ is secured to the lower end of the beam or shank instead of its face, as in plows of this class as heretofore constructed, the said lower portion of the beam or shank being brought forward, as shown, for this purpose.

By this construction a considerable space is left between the back part of the shovel and the curve of the beam, so that when plowing in grass, weeds, or corn-stubble, the accumulations readily pass over the shovel and leave it unclogged.

It will be observed that, by the peculiar attachment which I have shown, the shovel is made to project above the lower end of the beam, and thus serves to prevent accumulations of debris which have passed back over the shovel, from falling down again in front of the same.

The front end of the beam, where the hitching attachment is made, should be on a line with, or a little back of, the point of the shovel, to lighten the draft.

The two handles $c\ c$ are made in one piece, of light bar or tire iron, bent vertically and laterally, about as shown in the drawing, and at the center embracing the beam, to which it is bolted.

This construction insures strength in the handles, and rigidity in their attachment. The handles are braced by means of a rod, $d$, of round iron, passed through the beam above the point at which the handles are secured, and connected at the ends of a transverse brace, $e$, secured in the handles. Wooden hand-holds are fitted on the outer extremities of the handles.

To the under side of the shovel is riveted or otherwise secured a sole having an elbow, $f$, in which is a socket to receive the end of the beam, and also provided with a flange, $g$, to which a plate, $h$, is bolted. The end of the beam and the socket in which it is fitted are of such shape that a rigid connection is formed, and the joint is completed by a bolt passed through the parts, as shown.

The plate $h$ is made of steel, and has a sharp cutting-edge, so as to penetrate the soil at the bottom of the furrow, and serve to render the plow steady in its action, and prevent the zigzag movement which is common to shovel-plows of the ordinary construction.

It is obvious that the construction of the several parts of the plow may be somewhat varied without departing from the principles of my invention; and therefore I do not limit myself to the precise forms and details herein specified; and the several parts of my invention may be used, in some instances, independently of each other, as the curved beam, for example, possesses certain advantages not dependent upon any peculiar construction of handle, while the guide-plate attached to the shovel will perform its functions perfectly, whether the connection between the shovel and beam be made as herein described, or in any other suitable manner; therefore, Having fully described my invention, I claim as new and desire to secure by Letters Patent—

The beam $a$, when curved as described, in combination with the sole $f\,g$, guide-plate $h$, and shovel $b$, all arranged as specified.

To the above specification of my invention I have signed my name this 21st day of August, A. D. 1872.

JOHN PRESTON.

Witnesses:
P. S. BRINK,
HENRY AMERMAN,
GEO. W. LOVELAND,
H. B. BRUMBACH.